United States Patent [19]
Parks et al.

[11] 3,733,833
[45] May 22, 1973

[54] PLUGGING OF PERMEABLE MATERIALS

[75] Inventors: Christ F. Parks, Tulsa; Louis H. Eilers, Inola, both of Okla.

[73] Assignee: The Dow Chemical Company, Midland, Mich.

[22] Filed: Aug. 30, 1971

[21] Appl. No.: 176,324

[52] U.S. Cl. ................................................61/36 R
[51] Int. Cl. ..................................................E02d 3/12
[58] Field of Search ....................61/36 R; 166/294, 166/295, 300

[56] References Cited

UNITED STATES PATENTS

| | | | |
|---|---|---|---|
| 3,421,584 | 1/1969 | Eilers et al. | 166/295 |
| 3,502,149 | 3/1970 | Pence | 166/295 |
| 3,580,879 | 5/1971 | Higashimura et al. | 166/295 X |
| 3,583,167 | 6/1971 | Parks et al. | 61/36 R |

*Primary Examiner*—Reinaldo P. Machado
*Assistant Examiner*—David H. Corbin
*Attorney*—Bruce M. Kanuch et al.

[57] ABSTRACT

A method is provided for plugging permeable materials, preferably permeable earthen materials. An aqueous solution having a neutral to basic pH and containing dispersed therein a water soluble organic polymer containing a plurality of carboxylic groups and an organic material having an acid reaction is acidized to form a precipitate in situ in the permeable material thus reducing the permeability of the material.

11 Claims, No Drawings

3,733,833

PLUGGING OF PERMEABLE MATERIALS

BACKGROUND OF THE INVENTION

One of the most difficult to control sources of large scale water pollution is the drainage of acid mine waters into bodies of water, e.g., streams, lakes, etc. The drainage water from some mines, e.g., coal mines, is acid in reaction. This acidity is due to the presence of water soluble sulfates of iron, aluminum, magnesium and other minerals which hydrolyze in water to give an acid reaction. Factors responsible for the formation of acid mine waters are the presence of pyrite in the coal and associated strata, exposure of these materials to water and air by mining, the chemical oxidation of fine pyrite and the concurrent growth of iron oxidizing and sulphur oxidizing bacteria which aid the oxidation of the pyrite. These mine waters flow both over the surface and seep through permeable earthen formations into nearby sources of water. These acidic mine waters enter the water sources and reduce the alkalinity of the water. Iron and other inorganic hydroxides also precipitate in the water sources smothering biologic life, natural to the waterways. Down stream the higher sulfate content of the water constitutes an unsolved problem for municipal and industrial water supplies and further the river grows acid and corrosion of structures and floating equipment increases.

There have been several proposals to combat this serious problem. One widely taught method consists of diverting acidic mine waters through treatment plants whereby the water is neutralized and/or the various contaminating cations and anions are removed by directing the acid waters through ion exchange resins.

Secondly, it has been suggested to seal off the abandoned mines so that the supply of oxygen is cut off thus reducing the oxidation of the pyrites and other sulphur minerals.

More recently it has been suggested to seal off earthen strata by contacting the acid forming chemicals, notedly iron pyrites, in the soil with an aqueous alkali metal silicate containing solution to form, by reaction with the sulphuric acid, a silicate gel dispersed throughout the formation. This method essentially destroys the sulphuric acid at its source and precludes leaching out of the sulphuric acid or associate acid values.

None of these proposals have been completely successful. For example, it is physically impossible to divert all of the harmful acidic waters through treatment plants where they can be neutralized. Percolating water and subsurface acidic streams still continue to leach out the harmful pyrite compounds which continue on their way to nearby streams. Furthermore, the methods involving treatment plants can be very uneconomical. It is not always possible to completely seal abandoned mines and also, the acidic mine waters come from operating mines thus preventing such sealing. Although the silica gel system does provide some help in preventing the leaching of the pyrite materials, this method does not entirely solve the problem.

It would be desirable, therefore, if a method could be developed which would hinder the seepage of acid mine waters through permeable formations and into nearby streams. The present invention concerns a method for plugging permeable materials and finds particular use in reducing acid mine water pollution. The method can be employed in conjunction with other recognized methods if desired.

SUMMARY OF THE INVENTION

A permeable material, preferably an earthen strata, is contacted with a neutral to basic aqueous solution having dispersed therein a water soluble organic polymer having a plurality of carboxylic groups and an organic material having an acid reaction. An acidic solution is contacted with the neutral to basic aqueous solution in the pores of the permeable material to form a substantially acid-insoluble precipitate in situ in the permeable material. Acidic mine waters can comprise the acidic solution.

In areas where acid mine waters collect in pools, e.g., abandoned strip mines, mine shafts and the like, the neutral to basic solution of, or a solid mixture of, the water soluble organic polymer and organic material having an acid reaction can be introduced directly into the water whereby a portion of it will react immediately to form a precipitate which will tend to seal the bottom of the pool. Some of the organic materials will follow natural occurring seepage channels and therein forms a precipitate to plug these channels.

In other areas, e.g., where surface waters run sporadically, the areas where seepage is occurring, or may occur, is treated with the neutral to basic solution. It is immaterial whether the neutral to basic solution precedes or follows the addition of the acidic solution, e.g., acid mine waters, to the permeable area. In both instances, upon contact with the acidic solution, a precipitate will form thus plugging the strata.

As employed herein organic compounds having an acid reaction is intended to mean those compounds which when dissolved in aqueous medium tend to dissociate to form free hydrogen ions and anions.

DETAILED DESCRIPTION OF THE INVENTION

Organic materials which can be employed have an acid reaction and a lower solubility in aqueous acidic solutions than in basic solutions. Organic materials which can be employed include, for example, certain fats, proteins, e.g., albumins, albuminates, peptones, organic acids, polyhydroxy compounds, e.g., lignins, tannins, aromatic polyhydroxy compounds, e.g., polyhydroxy phenols, hydroxy benzoic acid, activated amino acid materials such as those disclosed in U.S. Pat. No. 3,396,104 and the like. The compounds preferably contain multifunctional groups, e.g., OH—, SH—, etc.

The actual structure of lignins and of the lignin sulfonic acid derivatives is not known. The lignin compounds may be obtained from various sources, among which are digestor liquors, which are a waste product of chemical pulp-making processes common in the papermaking industries. These liquors may be utilized in the present process either in concentrated or unconcentrated form. Also, lignin derived from such liquors or from various lignin-containing fibrous vegetation or decomposition products thereof may be used to supplement them or used in lieu of digestor liquors.

Wood is largely composed of lignocellulose; lignin and cellulose in some form of combination. In making paper pulp, chipped wood is treated with reagents adapted to bring the lignin into aqueous solution, leaving the cellulose as an insoluble residue. In the so-called soda process, the wood is extracted with caustic soda under high pressure and temperature, and the lignin with some minor constituents goes into solution as soda compounds. The liquid is termed soda black liquor. From the solution a lignin can be precipitated, along with some associated resins, by neutralization or acidification. The lignin being largely insoluble in water, the precipitate can be washed free of soluble matters leaving a fairly pure lignin. The lignin is not identical with natural lignin, that is lignin as it exists in the wood, but has rather parallel properties. It may be called "recovered lignin." In lieu of extracting wood with caustic soda, in the sulfate or kraft processes alkaline extracting solutions are employed containing various sulfur compounds; sulfides, polysulfides, thiosulfates, sulfates, etc. Such pulp making processes also yield aqueous lignin solutions; those also containing sulfur compounds, and are known as sulfate black liquors. These liquors can be acidified to cause precipitation of lignin, and the lignin washed free of soluble matters and recovered in fairly pure form. Such lignin is not identical with the precipitated lignin from soda process liquors but is quite similar thereto. Liquors obtained by alkaline extraction of other vegetable substances such as straw, jute or corncobs are also suitable as a source of recovered lignin. The lignin obtained from these alkaline extraction liquors differ, not only from natural lignin, but also from the lignin compounds extracted from wood by various organic solvents and the sulfonated lignin derivatives obtained by the so-called bisulfite processes.

All these forms of lignins may be employed in the present invention. Dry sodium lignin from pine or dry lignin from pine are particularly effective in the present process. A mixture of lignin materials obtained as waste from pulp mills and the like and water soluble organic polymers may be used directly in acid mine water pools or placed directly in abandoned mines where they come into contact with leaching waters and the like.

The tannins are a large groups of water-soluble, complex organic compounds, widely distributed throughout the vegetable kingdom. Almost all trees and shrubs contain some tannin in the leaves, twigs, bark, wood or fruit. The purest form of tannin is known as gallotannin which is obtained from nutgalls. Tannin is found in the bark from Mangrove, Oak, Hemlock, Pine, and Willow trees; from the wood of Quebracho, Chestnut and Oak trees; from Sumac and Gambir leaves, and from other vegetables. The tannins have been conventionally divided into two principal groups — the catechol tannins and the pyrogallol tannins. Tannin materials from both these groups can be employed to prepare successful plugging agents useful in the present invention. They are preferably dissolved in alkaline solutions with the water soluble organic polymer and employed in the same manner as the lignin materials.

The terminology "water-soluble, organic polymer," as used herein refers to anionic, or ampholytic organic materials composed of a number of repeating units or mers and containing a plurality of carboxylic groups. The useful polymers are characterized by dispersibility in water to form visually continuous solutions or dispersions. This includes truly water-soluble polymers which disperse in water to provide homogeneous, transparent solutions subject to water dilution without phase separation. Also included within the meaning of water-soluble, as used herein, are the water-swellable polymers which readily disperse in water to provide a highly disperse and visually continuous system of individually distinct, gel particles.

The water-soluble, organic polymers useful herein are available in a wide variety of chemical composition. They may be obtained as natural polymeric products, by modification of natural polymers or by synthesis from polymerizable materials.

In addition to the carboxylic groups the presence in and along the polymer chain of a number of other hydrophilic moieties sufficient to more than offset the otherwise hydrophobic character of the organic polymer can be present. One class of such hydrophilic moieties includes the ionizable groups. Among these are the sulfate and sulfonate groups, carboxylate salt groups, amino and ammonium groups, the latter being inclusive of protonated as well as quarternary derivatives of the amines, e.g., mono-, di- and trialkyl substituted ammonium salt groups, and phosphoric acid groups and mono- and dibasic salts thereof. Whenever acid salts are referred to, those generally intended are the alkali metal, alkaline earth metal (water-soluble species thereof) and ammonium salts.

Another class of water-solubility imparting, hydrophilic moieties are such nonionizable groups as carboxamide and mono- and dialkyl N-substituted carboxamides, having a total of up to about eight carbons. Also of a hydrophilic nature, though less strongly than some of the aforementioned groups are, hydroxyl, acetal, ketal, carbamate and lactam groups. In any event, the polymers employed herein contain a plurality of carboxylic groups and may also contain one or more of the aforedescribed hydrophilic moieties, and the like, in and along the polymer chain in a sufficient amount to render the resulting polymer watersoluble as defined above.

The polymers used in the invention are characterized by a high molecular weight. An adequate molecular weight is shown if the polymer can be obtained as a particulate solid and a 2 per cent by weight solution of the polymer in water, at a pH of 7, has a viscosity measured with a Brookfield viscosimeter at 25°C of at least 10 centipoises.

Technology for preparing the water-soluble polymers useful herein is known. Useful ethylenically polymerized polymers are described in Hedrick et al., U.S. Pat. No. 2,625,529, Aimone et al., U.S. Pat. No. 2,740,522 and Booth et al., U.S. Pat. No. 2,729,557. A variety of water-soluble polysaccharide derivatives are described in Gloor, U.S. Pat. No. 2,728,725. Water-soluble polyurethanes or chain extended polyols are taught in Honea et al., U.S. Pat. No. 3,054,778 and a variety of polycarbonates and polylactams in Hibbard et al., U.S. Pat. No. 3,044,982; Walles et al., U.S. Pat. No. 2,946,772; Vitales, U.S. Pat. No. 2,874,124 and Fong et al., U.S. Pat. No. 3,000,830. These are to mention but a few of the well-known chemical avenues for the preparation of water-soluble, macromolecules. Further general descriptions of a variety of water-soluble, particulate macromolecules is contained in Davidson and Sittig, "Water-Soluble Resins," Reinhold Publishing Corp., New York, 1962.

Preferred for use herein are water-soluble carbamoyl polymers which are at least partially hydrolyzed. The most common forms of these are ethylenically polymerized polymers having attached along their polyalkane backbone a plurality of carbamoyl groups according to the formula:

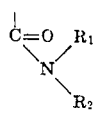

wherein $R_1$ and $R_2$ are independently selected from the group of hydrogen and alkyl hydrocarbons with one to four carbons.

In particular, useful carbamoyl polymers include the various water-soluble homopolymers and copolymers of acrylamide and methacrylamide. Other carbamoyl polymers are the various water-soluble copolymers of N-substituted acrylamides such as N-methyl acrylamide, N-propyl acrylamide and N-butyl acrylamide. Still other carbamoyl polymers are prepared from the amides and half amides of maleic and fumaric acids. In general, any ethylenically unsaturated and polymerizable monomer, which contains the carbamoyl group, may be employed in the preparation of the preferred carbamoyl polymers.

Best results are obtained, if at least about 25 mole per cent of the polymerized mers have carbamoyl substituents. The balance of the comonomers used to prepare the copolymers can be provided in the form of any water-soluble, or water-insoluble, monoethylenically monomer copolymerizable therewith, so long as the total amount of water-soluble monomers used is sufficient to impart water-solubility to the finished polymer.

Other water-soluble polymers useful herein are the lightly cross-linked water-swellable polymers. Such cross-linking can be achieved by irradiation of linear, water-soluble polymers under conditions which promote cross-linking or by incorporating a small amount, e.g., up to 1 percent by weight, of a polyfunctional monomer into the polymerization recipe for a linear water-soluble polymer. Examples of such monomers, which may be copolymerized with monoethylenically unsaturated monomers, are methylenebisacrylamide, divinylbenzene, divinylether, divinylether of ethylene glycol and the like.

It is usually preferred that the polymer form a near neutral or basic pH value when dispersed in an aqueous solution, i.e., one which will not cause an acidic pH and thus cause a premature precipitate in the treatment fluid.

As indicated, one type of polymer found to be especially effective for this purpose is acrylamide polymers, including specifically polyacrylamide in varying degrees of hydrolysis and acrylamide copolymerized with one or more ethylenically unsaturated monomers such as acrylic acid, methacrylic acid, vinylsulfonic acid, vinylbenzylsulfonic acid, vinylbenzenesulfonic acid, and alkali and alkaline earth metal salts of such acids as described in U.S. Pat. No. 2,831,841, column 3, lines 34 to 45, and in U.S. Pat. No. 2,909,508, Examples 1 to 5.

Other water-soluble organic polymers found effective are synthetic derivatives of cellulose and natural occurring water-soluble gums which preferably produce a neutral to alkaline pH when dispersed in an aqueous solution, and modified starches having similar characteristics. Examples of natural gums which contain a plurality of carboxylic groups and which produce a near neutral pH are quince seed gum, agar sodium alginate, sodium pectate, and the like. Certain tree exudates are also operable. Cellulose derivatives which may be employed include, for example, methylcellulose, hydroxy propyl methylcellulose, cellulose ethers and esters, e.g., as set out in *Encyclopedia of Chemical Technology*, 2nd Ed., Vol. 4, page 618, John Wiley and Sons, New York, and other similar suspending agents. The exact agent employed is not critical to the practice of the invention except to the extent that it functions as defined hereinbefore, i.e., it must contain a plurality of carboxylic groups.

The amount of organic material having the acid reaction and water-soluble organic polymer to be employed is merely one of practical matter and depends on the nature of the strata to be treated, quantity of acid mine waters and the like.

A useful composition for practicing the principles of the present invention comprises a basic solution containing up to the solubility limit of the organic compound having an acid reaction and from about 0.01 to about 5 per cent by weight of at least one water-soluble organic polymer having the characteristics defined hereinbefore. Specifically the organic compound having the acid reaction may be employed in an amount ranging from about 0.05 to about 20 per cent by weight of the aqueous composition. A preferred composition comprises from about 0.1 to about 10 per cent by weight of the organic material having an acid reaction, e.g., a lignin or tannin, and from about 0.05 to about 1 per cent by weight of at least one water-soluble organic polymer as defined herein.

Optionally a water soluble silicate may be included in the aqueous solution in an amount up to about 40 per cent by weight, preferably up to about 15 per cent by weight of the aqueous composition. Silicates which may be employed include those which form a gel when in an acidic environment such as, for example, those taught in U.S. Pat. No. 3,094,846, the teaching of which are specifically incorporated herein by reference.

The aqueous solution is neutral to basic. It may be made neutral to basic by the use of any water-soluble basic material which is compatible with the other constituents of the composition. For example, water soluble alkali and alkaline earth metal hydroxides, carbonates, oxides, silicates and phosphates can be employed. The exact method of preparing the neutral to basic solution is not critical to the practice of the present invention.

When it is desirable to treat earth strata directly the lignin material and organic polymer are preferably dissolved in an alkaline solution and the strata treated with this solution. In this manner the plugging solution can penetrate the strata forming a precipitate in situ thus restricting further seepage of acid mine waters.

The following examples will facilitate a more complete understanding of the present invention.

EXAMPLE 1

A tailings pile containing pyritic waste is seeping acidic fluid into a Colorado stream. Oxygen and bacteria, in the presence of water, oxidize the sulfide pyrites to sulfuric acid and soluble metal sulfates. It is desired to seal the surface of the tailing pile so that surface water cannot enter.

A sample of the pyritic tailings was obtained and the following tests conducted to demonstrate that the surface could be sealed to reduce water intrusion. Four inch depths of tailings were placed in 1-inch diameter glass tubes. These were treated with various sealants and the following results obtained with a 4.6 foot head of water (2 psi) placed on top of the treated surface to speed up seepage results.

TABLE I

| Test No. | Treatment Fluid | Mls Seepage Per Hour Through One Inch Diameter Surface |
|---|---|---|
| 1 | None (blanks) | 40 to 45 |
| 2 | 0.5 mls of an aqueous solution containing 10% by weight sodium lignate* | 11.0 |
| 3 | 1.0 mls 10% sodium lignate* | 4.4 |
| 4 | Two applications of 0.5 mls 10% sodium lignate, 24 hours apart | 3.2 |
| 5 | 1.0 ml 10% sodium lignate with 0.1% by weight of anionic acrylamide polymer having a molecular weight ranging from 4 to 6 million and about 30% hydrolyzed | 0.8 |
| 6 | 1.0 ml 10% sodium lignate with 0.2% of a 6% hydrolyzed acrylamide polymer | 2.6 |
| 7 | 1.0 ml 10% sodium lignate with 0.2% of nonionic acrylamide polymer containing nocarboxylic groups | 3.2 |
| 8 | 1.0 ml 10% sodium lignate with 1% pectin | 1.8 |
| 9 | 1.0 ml 10% sodium lignate with 1% sodium alginate | 2.4 |
| 10 | 0.5 ml 8% by weight of sodium silicate | 29.0 |
| 11 | 1.0 ml 8% by weight of sodium silicate | 8.6 |
| 12 | 1.0 ml 8% by weight acidified sodium silicate | 33.6 |
| 13 | 1.0 ml 0.1% anionic acrylamide polymer used in Test No. 5 | 7.8 increasing in 24 hours to 14.6 |

*The sodium lignate used was Indulin C from West Virginia Pulp and Paper Company

EXAMPLE 2

It was desired to seal the soil beneath a copper waste heap so that acid leaching of the entire tailings heap could be accomplished. The leach solution was to be dilute sulfuric acid. The soil beneath the waste heap was sandy with 82 percent of the particles in the 80–200 mesh particle size range. A capped tube 0.75 inch in diameter containing a 6 inch depth of the soil was treated first with the dilute $H_2SO_4$ leach fluid at 3 psi followed by a sealant material at 3 psi and finally leach fluid at pressures slowly increasing to a maximum of 20 psi.

Table II

| Test No. | Treatment Fluid | Mls Seepage Per Minute 3 psi | 20 psi |
|---|---|---|---|
| 1 | None (blank) | 15–18 | 102 |
| 2 | 10 mls 10% sodium lignate | — | 4 |
| 3 | 10 mls 2% sodium lignate | — | 11 |
| 4 | 10 mls 1% sodium lignate | — | 28 |
| 5 | 10 mls 0.1% anionic acrylamide polymer of Test No. 5, Table I | — | 31 |
| 6 | 10 mls 1% sodium lignate with 0.1% anionic acrylamide polymer of Test No. 5 | — | 2 |
| 7 | 10 mls 2% sodium lignate with 0.2% anionic acrylamide polymer of Test No. 5 | — | approx. 0.3 |
| 8 | 10 mls 1% sodium lignate with 0.2% partly anionic acrylamide polymer of Test No. 6, Table I | — | 10 |
| 9 | 50 mls 0.2% sodium lignate with 0.02% anionic acrylamide polymer of Test No. 5 | — | 6 |

EXAMPLE 3

A dam was built to contain acidic seepage from a waste heap. Acidic fluid seeped into a sandy gravel section beneath the pond and then beneath the dam. It was desired to grout the porous gravel to contain the leach fluid within the pond. Capped tubes 0.75 inch diameter and 6 inches long were filled with the gravel — 52 percent 6–20 mesh, the remainder finer. The acidic leach solution was circulated through the tube at 3 psi while grout material was injected through a separate opening at the same time. If it appeared that a seal was being obtained, pressure was increased to 20 psi on the leach fluid.

TABLE III

| Test No. | Treatment Fluid | Mls Seepage Per Minute 3 psi | 20 psi |
|---|---|---|---|
| 1 | None (blank) | 270 | approx. 1400 |
| 2 | 8 mls 10% sodium lignate | 61 | — |
| 3 | 8 mls 2% sodium lignate | 126 | — |
| 4 | 8 mls 0.2% anionic acrylamide polymer of Test No. 5, Table I | 115 | — |
| 5 | 8 mls 2% sodium lignate with 0.1% anionic acrylamide polymer of Test No. 5, Table I | 44 | 300 |
| 6 | 8 mls 35% sodium silicate | 30 | 230 |
| 7 | 10 mls 18% acidified sodium silicate with 0.5 nonionic acrylamide polymer | 176 | — |
| 8 | 10 mls - same as Test 7 but circulation stopped for 24 hours after injection | approx. 2 | 18 |
| 9 | 8 mls 30% sodium silicate with 1% sodium lignate and 0.1% anionic acrylamide | 0 | 2.5 |

In all these examples it is demonstrated that the use of a solution containing both an organic compound having an acid reaction and an organic polymer containing carboxylic groups were much more effective than when either constituent was employed alone. Also it is shown that the composition of the invention can contain optional constituents such as silicate plugging agents known in the art.

What is claimed is:

1. A method for reducing the permeability of porous material which comprises:

reacting in situ in said porous material a neutral to basic aqueous solution having dispersed therein at least two different organic compounds having an acid reaction, one of said organic compounds consisting of a water soluble organic polymer having a plurality of carboxylic groups, with an acidic aqueous solution to form an organic precipitate in situ in the porous material.

2. The method of claim 1 wherein the other of said organic materials having the acid reaction is selected from the group consisting of lignins or tannins.

3. The method of claim 1 wherein the permeable material is earthen strata.

4. The method of claim 3 wherein the acidic aqueous solution comprises acid mine waters.

5. The method of claim 3 wherein the other of said organic materials is selected from the group consisting of tannins or lignins.

6. The method of claim 1 wherein the neutral to basic aqueous solution also contains a water soluble silicate.

7. The method of claim 1 wherein the water soluble organic polymer is an acrylamide polymer.

8. The method of claim 1 wherein the water soluble organic polymer is an acrylamide polymer and the other organic material having the acid reaction is a lignin, tannin or mixture thereof.

9. The method of claim 1 wherein the neutral to basic aqueous solution comprises up to the saturation level of the organic material having an acid reaction, and from about 0.01 to about 5.0 per cent by weight of said water soluble organic polymer.

10. The method as defined in claim 9 including in addition up to about 40 per cent by weight of a water soluble silicate.

11. A method for selectively reducing the permeability of a permeable earthen formation which comprises:
precipitating in situ in a selected portion of said permeable formation an effective amount of a combination of two organic compounds said first compound consisting of an organic polymer containing a plurality of carboxylic groups and the second organic compound selected from the group consisting of at least one of a lignin or tannin compound, to reduce the permeability of said permeable formation to the flow of a fluid.

* * * * *